United States Patent Office 3,085,817
Patented Apr. 16, 1963

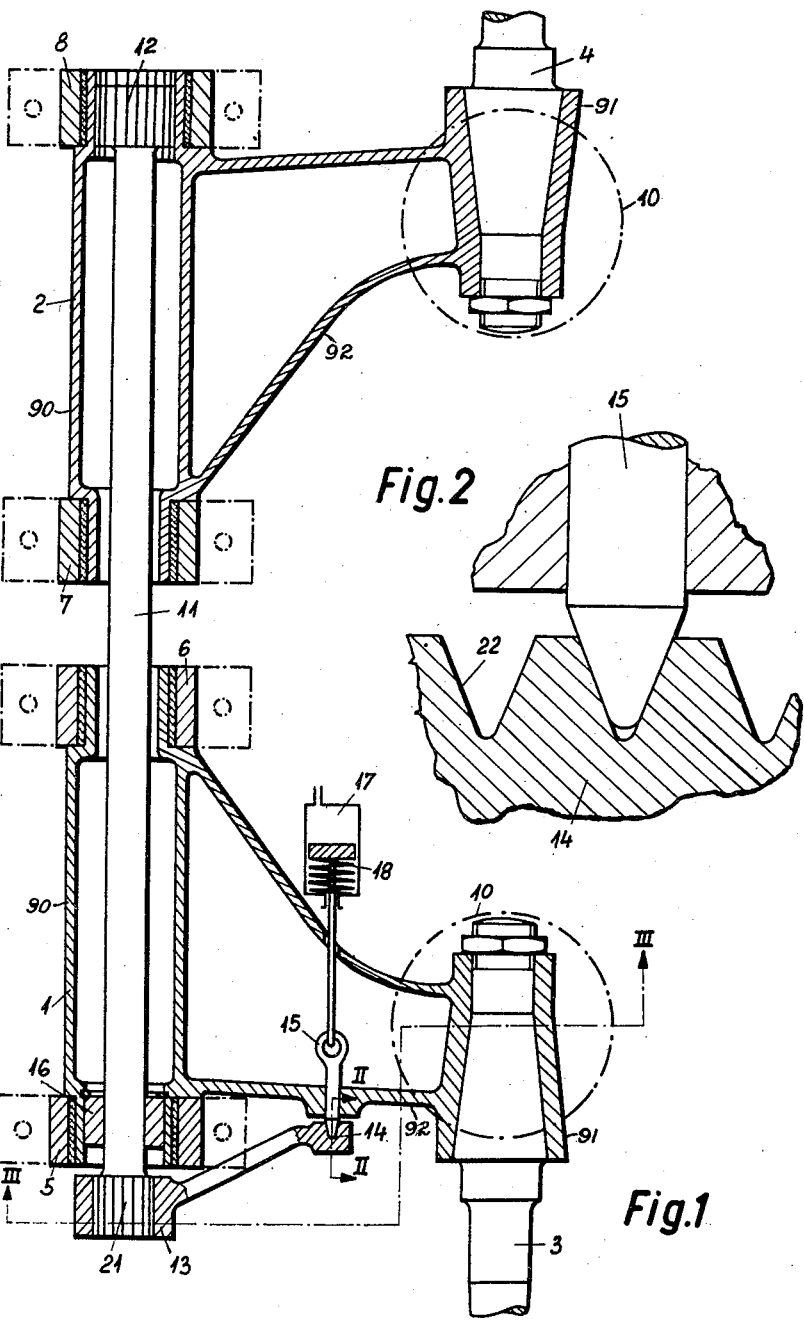

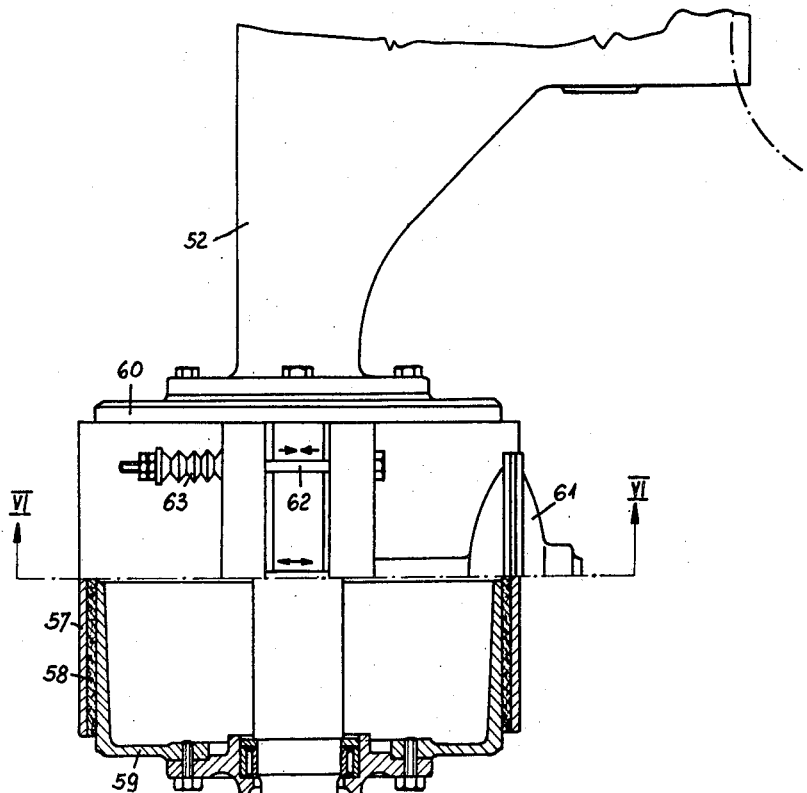
Fig. 5
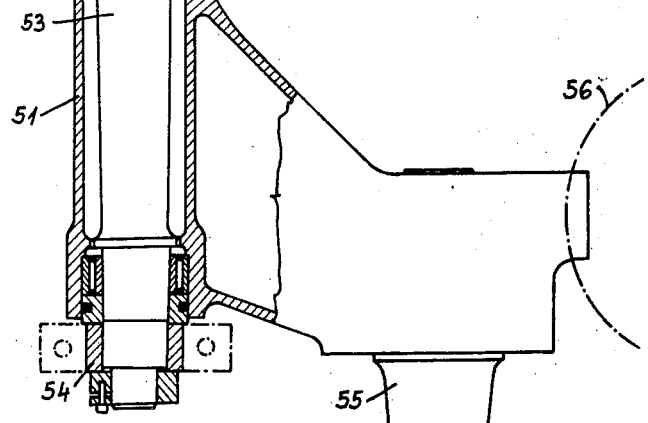

3,085,817
METHOD OF AND DEVICE FOR STABILIZING CRANK AXLES WITH PNEUMATIC CUSHIONING
Georges Krause and Rudolf Friedrich Hübscher, Schaffhausen, Switzerland, assignors to Georg Fischer A.G., Schaffhausen, Switzerland
Filed Aug. 7, 1959, Ser. No. 832,398
Claims priority, application Switzerland June 30, 1959
6 Claims. (Cl. 280—124)

Pneumatic cushioning of road vehicles secures very substantial advantages for the driving comfort of passengers and for the safe handling of delicate goods to be conveyed. By employing an air cushion type suspension system, the vehicle designer has the possibility of choosing a very low spring or elasticity constant. As a result, it will be possible to obtain a very low natural frequency of the system of the wheel suspension and of the spring supported vehicle mass, which will be out of the range of self-excitation. In certain automotive designs, the range of the spring rate can even be modified in operation. Driving comfort and road-holding properties of vehicles are substantially improved, particularly when not loaded. Owing to the flat spring characteristic, vehicles equipped with pneumatic cushioning, however, most sensitively respond to centrifugal forces such as are operative in curves so that these vehicles display a pronounced tendency to side tilt during cornering. For straight road stretches, soft suspension is desirable. In curves it can make itself unpleasantly felt. Particularly with lorries having rigid axles, side tilt in cornering is very pronounced because the lever arm of the centrifugal force is comparatively long at the center of gravity compared with the distance of the spring from the axle center forming the lever arm for the supporting force.

Conditions are considerably better with crank axles and, respectively, pull rods which are pneumatically cushioned. Independently of where the spring element is arranged, the wheel track is the point of application of the raising spring force because the internal system of forces remains closed in this type of wheel suspension according to the crank axle system by the parallel arrangement of all axes originally parallel. An upward movement of the vehicle wheel along its track is linearly transmitted to the spring member independently of the vehicle width at which it is attached. However, a certain sensitivity still obtains with this independent wheel suspension in curves because the pneumatic cushioning member in fully opened condition still transmits a bearing force due to the residual pneumatic pressure. This additionally increases side tilt in cornering and can be absorbed e.g. by limiting the stroke.

The present invention has for its object to eliminate this disadvantage of pneumatic cushioning and to provide good driving properties in curves by means of a stabilizer. Firmly incorporated torsion stabilizers continuously in operation have been developed for various wheel suspension systems.

The scope of the present invention covers a method of stabilizing vehicles with crank axles, and, respectively, pull rods and pneumatic cushioning. It is distinguished from the designs so far known to the art by the fact that pairs of opposite crank axles are coupled together so as to be torsionally rigid only during the rounding of curves by means of a coupling member, while the two axles can freely move independently of one another on straight stretches of road.

A particular characteristic of the method according to this invention resides in the fact that the coupling of the two crank axles and, respectively, pull rods, is engaged and disengaged by rotation of the bogie. The associated device is characterized by two opposed crank axles connected by means of a disengageable coupling of which the actuation can be controlled from the steering station.

Various embodiments of the invention are represented in the drawing in which:

FIG. 1 is a plan view of two crank axles according to the invention in section;

FIG. 2 is a section of a detail of the embodiment according to FIG. 1 taken along line II—II in FIG. 1;

FIG. 5 is a plan view of a further embodiment of the invention with an exterior band brake constituting the coupling member, partly in section and partly in elevation;

Figure 3:
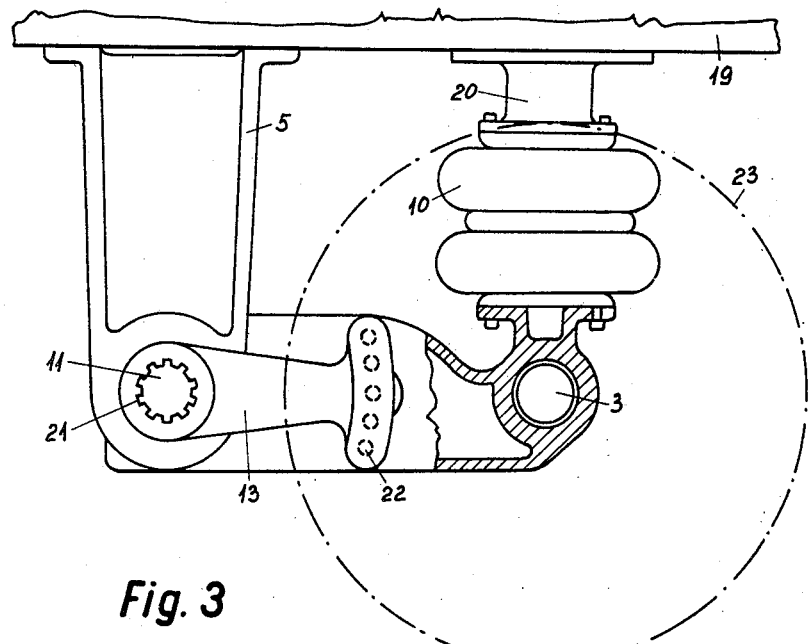
FIG. 3 is an elevation cross-sectional view of the embodiment according to FIG. 1, shown partly in section and taken along line III—III thereof.

FIG. 1 shows a plan sectional view of two identical crank axles or pull rods 1 and 2 with the axle journals 3 and 4 for the vehicle wheels indicated. In powered vehicles, the axle journals 3 and 4 must be replaced by a tubular axle with a driving shaft. The two crank axles 1 and 2 are attached to the vehicle frame by means of bearing brackets 5, 6, 7 and 8. The straps of the bearing brackets are indicated in dot-dash lines in the plan view (FIG. 1) since they are located above the plane of the section. Also located above the plane of the section are the pneumatic cushioning members 10 which provide the resilient connection between the wheel 23 and the vehicle frame 19 (FIG. 3).

The crank axles 1 and 2 can independently perform oscillating rotary movements in the bearing brackets 5, 6, 7 and 8. Stabilization of the vehicle body in curves is ensured by a torsion bar 11, preferably formed of spring steel, which extends through the bores provided in the two crank axles 1 and 2. Serrations 12 provided on the crank arm 2 and the torsion bar 11 lock the torsion bar to the crank arm 2. The torsion bar 11 transmits the rotary movements of the crank arm 2 to a connecting rod 13 which is also rigidly attached to the said torsion bar 11 by means of serrations 21. According to FIGS. 1 and 3, the connecting rod 13 is rigidly coupled by means of the engagement of a mobile pin 15 arranged in the crank axle 1 and engageable with an eye 14. With the movable pin 15 in forward position, the torsion bar 11 operates as a resilient coupling between the two crank axles 1 and 2. It transmits the stresses exercised on the wheel from one side of the vehicle to the other, thereby ensuring a reduction of the vehicle tilt in curves. The spring bellows inside the curve transmits its additional bearing power to the crank axle outside the curve and takes up part of its load.

In FIG. 1 a guide bearing 16 is provided in the bore of the crank axle 1. Engagement and disengagement of the coupling in a curve is preferably performed by a control member, such as a pin and cam, in the bogie of the front axle. Transmission of the control impulse may be effected by a linkage, cable or, as shown in FIG. 1, by means of a pneumatic cylinder 17 and a return or pull-back spring 18. Obviously, the coupling pin 15 may be retracted pneumatically or hydraulically. The control impulse for the engagement or disengagement of the coupling may, however, be supplied by some other member of the vehicle control assembly. As can be seen in FIGURE 1, the crank axles 1, 2 are each formed of a pair of spaced tubular members 90, 91 interconnected by a substantially trapezoidal shaped frame 92. The longer tubular member 90 internally receives the torsion bar 11 and the shorter tubular member 90 carries the journals 3, 4 for the wheels. In the remaining embodiments the crank axles may be similarly formed.

FIG. 2 shows a detail of the pin coupling in the recess or eye 14 of the connecting rod 13.

FIG. 3 is an elevational view of the embodiment according to FIG. 1 with the pneumatic cushioning member 10, the supporting bracket 20 and the bearing bracket 5 both attached to the vehicle frame 19. The torsion bar 11 transmits the stabilizing force to the connecting rod 13 by means of its serration, the said connecting rod being provided with several conical pin bores 22. The circumference of the vehicle wheel is represented by the dotted circle 23.

Figure 4:
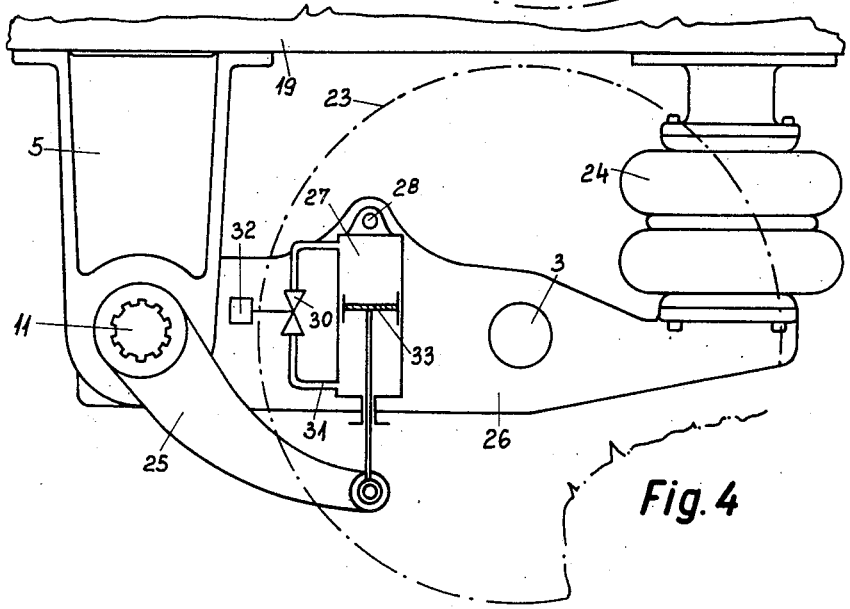
FIG. 4 is an elevation of an alternative embodiment, in part shown diagrammatically.

FIG. 4 is an elevational view of an alternative embodiment of the invention having a pneumatic cushioning member 24 arranged behind (or in front of) the axle 3 relative to the direction of travel. The connection between the connecting rod 25 with the crank axle 26 is effected hydraulically by a double-action cylinder 27 and an attachment eye 28. The valve 30 of the by-pass line 31 remains open when the vehicle is driven straight ahead so that the crank axle 26 can oscillate independently of the connecting rod 25, i.e. also independently of the opposite crank axle. In curves, a control impulse issued e.g. from the bogie will close the by-pass line 31 via the control member 32 of the valve 30 so that the cylinder 27 and the piston 33 are hydrostatically interlocked; this causes the two crank axles to be coupled together through the elastic torsion bar 11.

Figure 6:
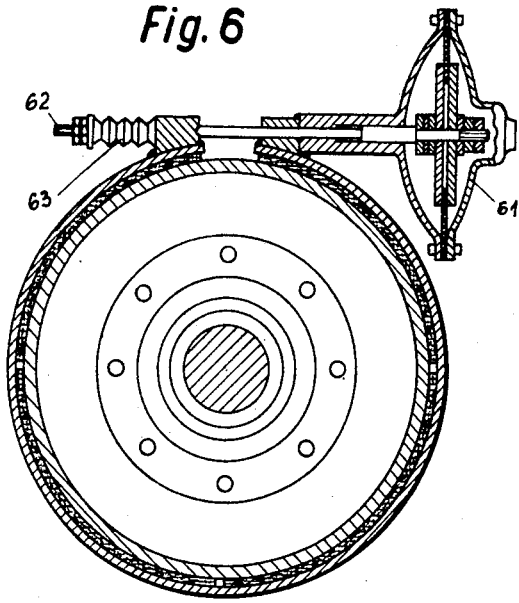
FIG. 6 is a section of the same embodiment taken along line VI—VI in FIG. 5.
Figure 7:
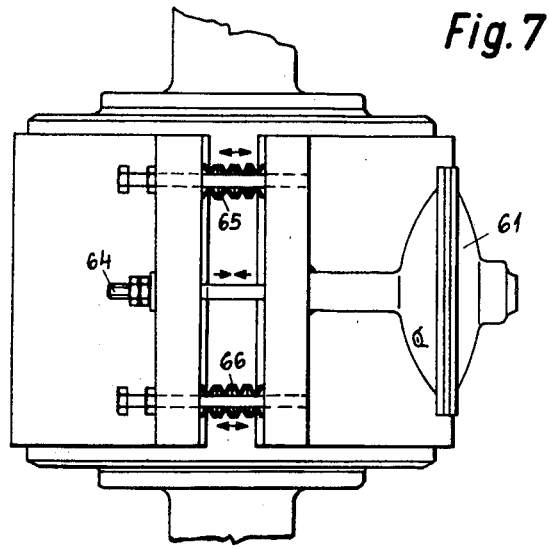
FIG. 7 is a plan view of an alternative embodiment of the band brake.

FIG. 5 shows a further embodiment of the invention provided with two crank axles 51 and 52. The crank axles 51 and 52 are rotatably arranged on a continuous shaft 53 by means of bearing brackets 54 in the vehicle frame. The axle journal 55 and the pneumatic cushioning member 56 are only indicated. Coupling of the two crank axles 51 and 52 in a curve is performed by an exterior band brake consisting of a band 57, preferably two brake linings 58 and the brake drums 59 and 60 each flanged to a crank axle. Actuation of the band brake is performed by means of a control cylinder 61 (FIG. 6). According to FIGS. 5 and 6 the control cylinder 61 is arranged to release the band brake while the control cylinder 61 applies the band brake in the arrangement according to FIG. 7. According to FIGS. 5 and 6 a tie rod 62 with plate springs 63 is incorporated. In a reversed arrangement according to FIG. 7, the control cylinder 61 may be employed to actuate the band brake by means of a tie rod 64 while the set of springs 65 and 66 is designed to release the band brake. The cylinder can again be actuated by means of compressed air or oil which is controlled by a control member arranged on the bogie. Naturally other control members may be arranged at the pole, steering linkage for axle journal control, or in the driver's cab. It is further possible, by incorporating a double-action cylinder, such as cylinder 27 of FIGURE 4, or at least two single-acting cylinders, to effect both coupling and releasing of the band brake hydraulically or pneumatically.

Figure 8:
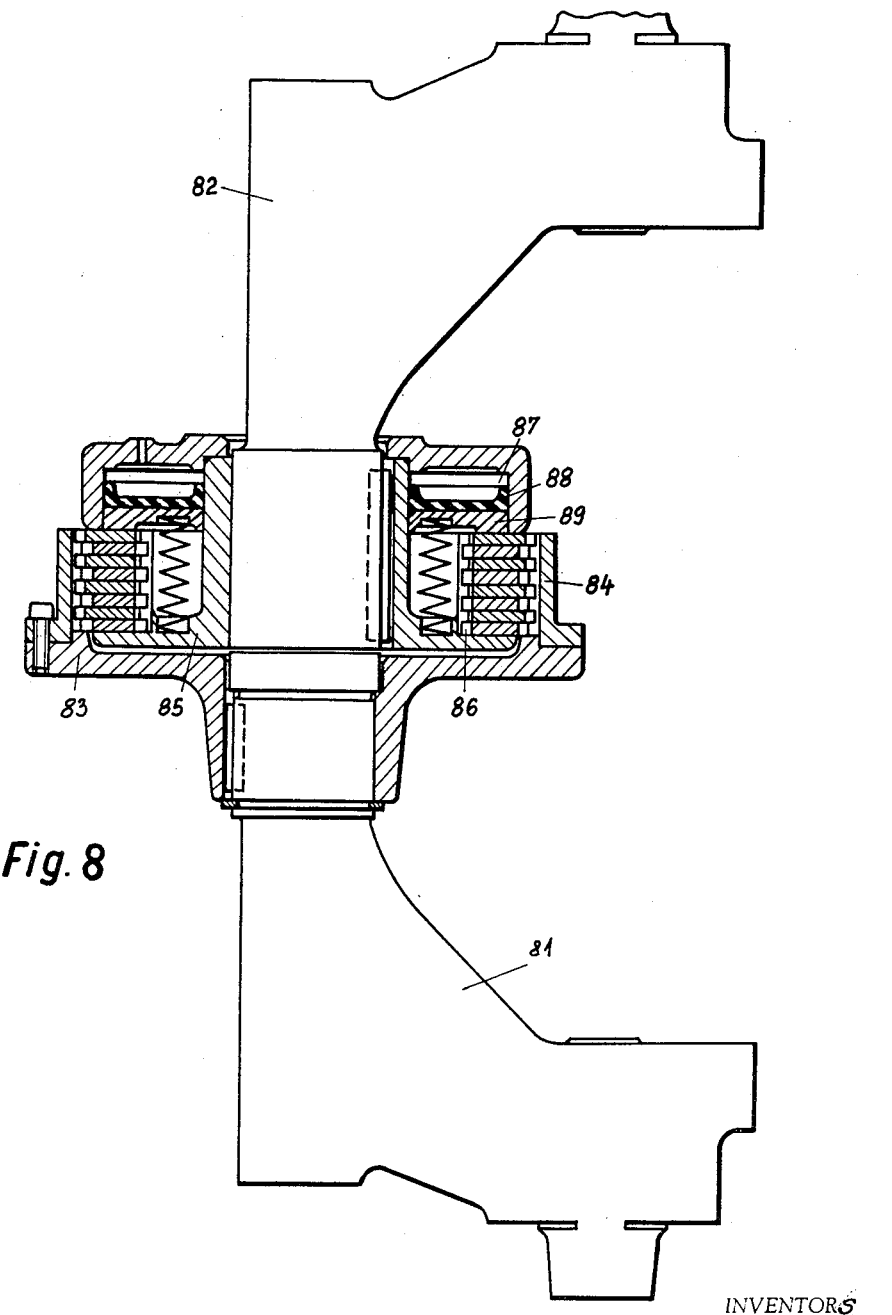
FIG. 8 is a plan view, partly in section, of a further embodiment of the invention with a multiple disk clutch.

FIG. 8 shows an embodiment of the disengageable connection of the two crank axles 81 and 82 by means of a pneumatically or oil-pressure controlled multiple disk clutch. The outer set of disks is driven, by means of a flange 83 and a serrated ring 84, from the crank axle 81 while the inner clutch disks are secured against rotation by the hub 85 via serration 86. Arranged in the ring cylinder 87 is a seal 88 and a ring piston 89 which are also hydraulically or pneumatically remote-controlled. Electromagnetic actuation may be provided for all coupling designs.

The advantage of the present invention results in an improved lateral sway stability of air cushioned vehicles. Application of this stabilizer assembly enables the air cushioning system to be provided with a very flat spring characteristic, which greatly improves driving comfort on straight stretches of road and reduces air consumption. Theoretically it would be possible to absorb any side tilt pneumatically, too, by a correspondingly finely adjusted control valve. However, this would greatly increase air consumption, which would require correspondingly dimensioned compressors and compressed air tanks.

Having now particularly described and ascertained the nature of our said invention and in what manner the same is to be performed, we declare that what we claim is:

1. A stabilizer for a vehicle having a frame, wheel means for carrying said frame, and pneumatic cushioning means for said frame and wheel means, comprising in combination, at least one pair of laterally spaced axially aligned hollow crank axles adapted to be supported by said frame and each in registry with one of a pair of oppositely arranged wheel means, a continuous shaft extending interiorly of said hollow crank axles and rotatably supporting said crank axles and adapted to be rigidly secured to said frame, drum means on the adjacent inner ends of the crank axles, and means including a band brake cooperable with the said drum means of said crank axles for coupling the same rigidly to one another during cornering of said vehicle, said crank axles in their coupled condition being torsionally rigid to reduce vehicle tilt in order to stabilize said vehicle.

2. A stabilizer for a vehicle according to claim 1, wherein said band brake is dipsosed externally of the said drum means of said crank axles in overlapping relationship thereto and substantially at the center of said frame.

3. A stabilizer according to claim 1, which further includes a control cylinder, a tie rod and spring means associated with said control cylinder and said band brake, said tie rod upon actuation by said control cylinder releasing said band brake to uncouple said crank axles from one another.

4. A stabilizer according to claim 1, which further includes a control cylinder, a tie rod and spring means associated with said control cylinder and said band brake, said spring means upon actuation by said control cylinder releasing said band brake to uncouple said crank axles from one another.

5. In a vehicle provided with a frame, oppositely arranged wheel means for supporting said frame, pneumatic cushioning means cooperable with said wheel means, the combination of, at least one pair of oppositely aligned crank axles supported for oscillatory rotational movement on said frame and supporting oppositely arranged wheel means, drum means fixed to the inner adjacent ends of said crank axles, a brake band spanning said drum means operable for selectively coupling said drum means and, therefore, said crank axles to one another in a torsionally rigid state during cornering of said vehicle, said band brake including brake lining means arranged around said drum means and a single band member disposed around said brake lining means, and a control cylinder connected to said band member for actuating said band brake to rigidly couple said crank axles to one another.

6. A crank-axle arrangement for heavy duty vehicles, such as trailer trucks; the combination of a frame, a pair of laterally spaced aligned crank axles supported by said frame, each of said crank axles including a pair of spaced hollow tubular members differing in length from one another and rigidly interconnected by a substantially trapezoidal-shaped frame portion, the longer tubular members of said respective crank axles being aligned and defining an axis of rotation for said crank axles, the shorter tubular members of said crank axles serving to support wheel means of said vehicle, pneumatic cushioning means interposed between said frame and said shorter tubular members, a support shaft extending through said longer tubular members and rotatably supporting said crank axles, coupling means associated with said longer tubular members operable to couple said crank axles in a torsionally rigid state during cornering of said vehicle to reduce tilt and stabilize said vehicle.

References Cited in the file of this patent
UNITED STATES PATENTS

| | | |
|---|---|---|
| 1,167,010 | Neel | Jan. 4, 1916 |
| 2,048,866 | Hunt | July 28, 1936 |
| 2,133,773 | Rossman | Oct. 18, 1938 |
| 2,757,376 | Brueder | July 31, 1956 |
| 3,003,782 | Hickman | Oct. 10, 1961 |